United States Patent
Minke et al.

(10) Patent No.: US 7,605,505 B2
(45) Date of Patent: Oct. 20, 2009

(54) ROTATING ELECTRIC MACHINE ROTOR POLE CROSSOVER

(75) Inventors: David R. Minke, Tucson, AZ (US); David E. Stout, Tucson, AZ (US); Simon L. Waddell, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 490 days.

(21) Appl. No.: 11/213,172

(22) Filed: Aug. 26, 2005

(65) Prior Publication Data
US 2006/0261691 A1 Nov. 23, 2006

Related U.S. Application Data

(60) Provisional application No. 60/682,482, filed on May 18, 2005.

(51) Int. Cl.
H02K 11/00 (2006.01)
(52) U.S. Cl. ............... 310/71; 310/260; 310/270
(58) Field of Classification Search .............. 310/71, 310/260, 270
See application file for complete search history.

(56) References Cited

U.S. PATENT DOCUMENTS

| | | | | |
|---|---|---|---|---|
| 3,219,857 | A | | 11/1965 | Fisher |
| 3,295,083 | A | * | 12/1966 | Fiore ........................ 336/30 |
| 3,725,707 | A | * | 4/1973 | Leimbach et al. .......... 310/71 |
| 3,748,510 | A | * | 7/1973 | McNeal ..................... 310/71 |
| 3,760,339 | A | * | 9/1973 | Marshall ................. 439/733.1 |
| 4,056,880 | A | | 11/1977 | Stewart |
| 4,177,397 | A | * | 12/1979 | Lill ........................... 310/71 |
| 4,227,103 | A | * | 10/1980 | Humes et al. .............. 310/71 |
| 4,386,288 | A | | 5/1983 | Laurie |
| 4,409,502 | A | * | 10/1983 | McCabria .................. 310/61 |
| 4,585,964 | A | * | 4/1986 | Hildebrandt ............... 310/71 |
| 4,642,885 | A | * | 2/1987 | King ........................ 29/596 |
| 4,870,308 | A | | 9/1989 | Sismour, Jr. |
| 5,039,896 | A | | 8/1991 | Adams et al. |

(Continued)

FOREIGN PATENT DOCUMENTS

JP 52107503 A * 9/1977

(Continued)

OTHER PUBLICATIONS

Shibata et al, Interpole Connection Structure For A Rotary Electric Machine, May 1987, JP 62-104446, All English translation of above JP art is provided.*

(Continued)

Primary Examiner—Quyen Leung
Assistant Examiner—Naishadh N Desai
(74) Attorney, Agent, or Firm—Oral Caglar, Esq.

(57) ABSTRACT

A rotor for use in a high speed electrical machine includes a shaft, a plurality of poles, a plurality of coils, and a rotor crossover that is relatively flexible, and that does not crack under the centrifugal forces and the mechanical and thermal cycles encountered during machine operation, startup, and shutdown. The poles extend radially outwardly from the shaft and are spaced apart from each other to form an interpole region, and the coils are wrapped around the poles. The rotor crossover is coupled between selected ones of the coils, and includes a stranded wire conductor and an insulator.

19 Claims, 7 Drawing Sheets

U.S. PATENT DOCUMENTS

| | | | |
|---|---|---|---|
| 5,065,059 A | | 11/1991 | Adams et al. |
| 5,111,097 A | * | 5/1992 | Londergan et al. ........... 310/261 |
| 5,140,204 A | * | 8/1992 | Cashmore et al. ............. 310/61 |
| 5,191,248 A | * | 3/1993 | Huss ........................ 310/68 D |
| 5,789,840 A | | 8/1998 | Gould et al. |
| 5,932,948 A | * | 8/1999 | Morrison et al. ............ 310/214 |
| 5,973,432 A | * | 10/1999 | Katagiri et al. ............. 310/214 |
| 6,043,581 A | | 3/2000 | Tanaka et al. |
| 6,106,324 A | | 8/2000 | Kwapien et al. |
| 6,280,265 B1 | | 8/2001 | Hopeck et al. |
| 6,333,579 B1 | | 12/2001 | Hirano et al. |
| 6,700,276 B2 | * | 3/2004 | Hakamata ................... 310/179 |
| 6,930,434 B1 | * | 8/2005 | Spencer et al. .............. 310/270 |
| 7,095,146 B2 | * | 8/2006 | Fukazawa et al. ............. 310/89 |
| 7,247,966 B2 | * | 7/2007 | Shore et al. ................. 310/179 |
| 2002/0043883 A1 | * | 4/2002 | Shimizu ...................... 310/71 |
| 2002/0149278 A1 | * | 10/2002 | Eydelie et al. ................ 310/71 |
| 2003/0184180 A1 | * | 10/2003 | Doherty et al. ............. 310/214 |
| 2005/0231058 A1 | * | 10/2005 | Down et al. ................. 310/192 |
| 2005/0285469 A1 | * | 12/2005 | Shore et al. ................. 310/179 |
| 2006/0279146 A1 | * | 12/2006 | Ishigami et al. ................ 310/71 |
| 2007/0132325 A1 | * | 6/2007 | Hashiba ....................... 310/71 |

FOREIGN PATENT DOCUMENTS

| | | | | |
|---|---|---|---|---|
| JP | 55079639 | | | 6/1980 |
| JP | 55079639 A | * | | 6/1980 |
| JP | 61139243 | | | 6/1986 |
| JP | 61139243 A | * | | 6/1986 |
| JP | 62071448 A | * | | 4/1987 |
| JP | 52104446 | | | 5/1987 |
| JP | 62104446 A | * | | 5/1987 |
| JP | 62123934 A | * | | 6/1987 |
| JP | 08298738 A | * | | 11/1996 |
| JP | 09163654 A | * | | 6/1997 |
| JP | 09182340 A | * | | 7/1997 |
| JP | 11164507 A | * | | 6/1999 |

OTHER PUBLICATIONS

EP Search Report dated Aug. 1, 2007, EP 06114145.3.

* cited by examiner

ROTATING ELECTRIC MACHINE ROTOR POLE CROSSOVER

CROSS-REFERENCES TO RELATED APPLICATIONS

This application claims the benefit of U.S. Provisional Application No. 60/682,482, filed May 18, 2005.

TECHNICAL FIELD

The present invention relates to electrical machines, such as motors, generators, and motor/generators and, more particularly, to a rotor pole crossover that may be used in rotating electrical machines.

BACKGROUND

Rotating electrical machines such as, for example, generators, motors, and motor/generators, may include one or more rotors and one or more stators. The rotors may include at least a shaft and a rotor core. The rotor core is typically mounted on the shaft and may include a plurality of salient rotor poles. The number of rotor poles may vary, but the number is generally based on the speed at which the shaft will be rotating and, in the case of a generator, on the frequency of the electric current that is to be generated.

The rotor poles each have copper wire wound thereon, which is typically referred to as the rotor winding. Preferably, the rotor winding is configured to form a complete circuit from the point it enters the first rotor pole to the point it exits the last rotor pole. In many applications, the rotor winding is made of substantially flat, relatively stiff, coiled copper strips. Thus, the ends of the rotor winding between adjacent rotor poles are, in many instances, electrically connected using jumpers. These jumpers are sometimes referred to as rotor pole crossovers.

During machine operation, most notably for machines that rotate at relatively high speeds, substantial centrifugal forces may be exerted on the rotor winding and the rotor pole crossovers. Moreover, during machine startup and shutdown operations, the rotor pole crossovers may undergo potentially stressful mechanical and thermal cycles. The current direction in various applications, including aerospace quality electric power system applications, is toward higher power, higher speed, and lighter weight electrical machines. Thus, the rotor pole crossovers may experience relatively higher centrifugal forces.

The rotor crossovers that are presently used, while generally safe and reliable, do suffer certain drawbacks. For example, present rotor pole crossovers, which are also made from flat wire conductors, typically exhibit a lack of flexibility. As a result, these rotor pole crossovers may crack under the centrifugal forces and the mechanical and thermal cycles encountered during machine operation, startup, and shutdown. Indeed, in some instances, rotor poles crossovers have cracked all the way through, resulting in a loss of rotor electrical field.

Hence, there is a need for a rotor pole crossover for rotating electrical machines that is relatively flexible and/or will not crack under the centrifugal forces that may be exerted thereon during machine operation and/or will not crack under the mechanical and thermal cycles encountered during machine startup and shutdown operations. The present invention addresses one or more of these needs.

BRIEF SUMMARY

The present invention provides a rotor pole crossover for rotating electrical machines that is relatively flexible, and that does not crack under the centrifugal forces and the mechanical and thermal cycles encountered during machine operation, startup, and shutdown.

In one embodiment, and by way of example only, a rotor for use in a high speed electrical machine includes a shaft, first and second rotor poles, first and second coils, and a rotor crossover. The first and second rotor poles extend radially outwardly from the shaft and are spaced apart from each other to form an interpole region therebetween. The first and second coils are wrapped around the first and second rotor poles, respectively. The rotor crossover is coupled to the first and second coils, and includes a stranded wire conductor and an insulator. The stranded wire conductor has a first end section coupled to the first coil, and a second end section coupled to the second coil. The insulator surrounds the stranded wire conductor between the first end and the second end sections.

In another exemplary embodiment, a rotor for use in a high speed electrical machine includes a shaft, first and second rotor poles, first and second coils, and a rotor crossover. The first and second rotor poles extend radially outwardly from the shaft and are spaced apart from each other to form an interpole region therebetween. The first and second coils are wrapped around the first and second rotor poles, respectively, and each includes a plurality of turns of wire. The plurality of turns of wire include an innermost turn, an outermost turn disposed radially outward of the innermost turn, and a plurality of intermediate turns disposed between the innermost and outermost turns. Each turn of wire includes an inner surface and an outer surface that is disposed radially outward of the inner surface. The rotor crossover is coupled to the inner surfaces of the first and second coil outermost turns and includes a stranded wire conductor and an insulator. The stranded wire conductor has a first end section coupled to the first coil outermost turn, and the second end section is coupled to the second coil outermost turn. The insulator surrounds the stranded wire conductor between the first end and the second end sections.

In yet another exemplary embodiment, in a rotor including a shaft, first and second rotor poles extending radially outwardly from the shaft and spaced apart from each other to form an interpole region therebetween, and first and second coils wrapped around the first and second rotor poles, respectively, a method of electrically coupling first and second rotor coils together includes obtaining a length of stranded wire conductor having a first end section and a second end section and surrounded by an electrical insulation. A portion of the electrical insulation proximate the stranded wire conductor first and second end sections is removed. The first end section of the stranded wire conductor is coupled to the first coil, and the second end section of the stranded wire conductor is coupled to the second coil.

Other independent features and advantages of the preferred rotor crossover and method will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, it is to be appreciated that the present invention is not limited to use in conjunction with a specific type of electrical machine. Thus, although the present embodiment is, for convenience of explanation, depicted and described as being implemented in a 4-pole brushless AC (alternating current) generator, it will be appreciated that it can be implemented in other electric machines, with varying numbers of poles, that may be needed in specific applications.

Figure 1:
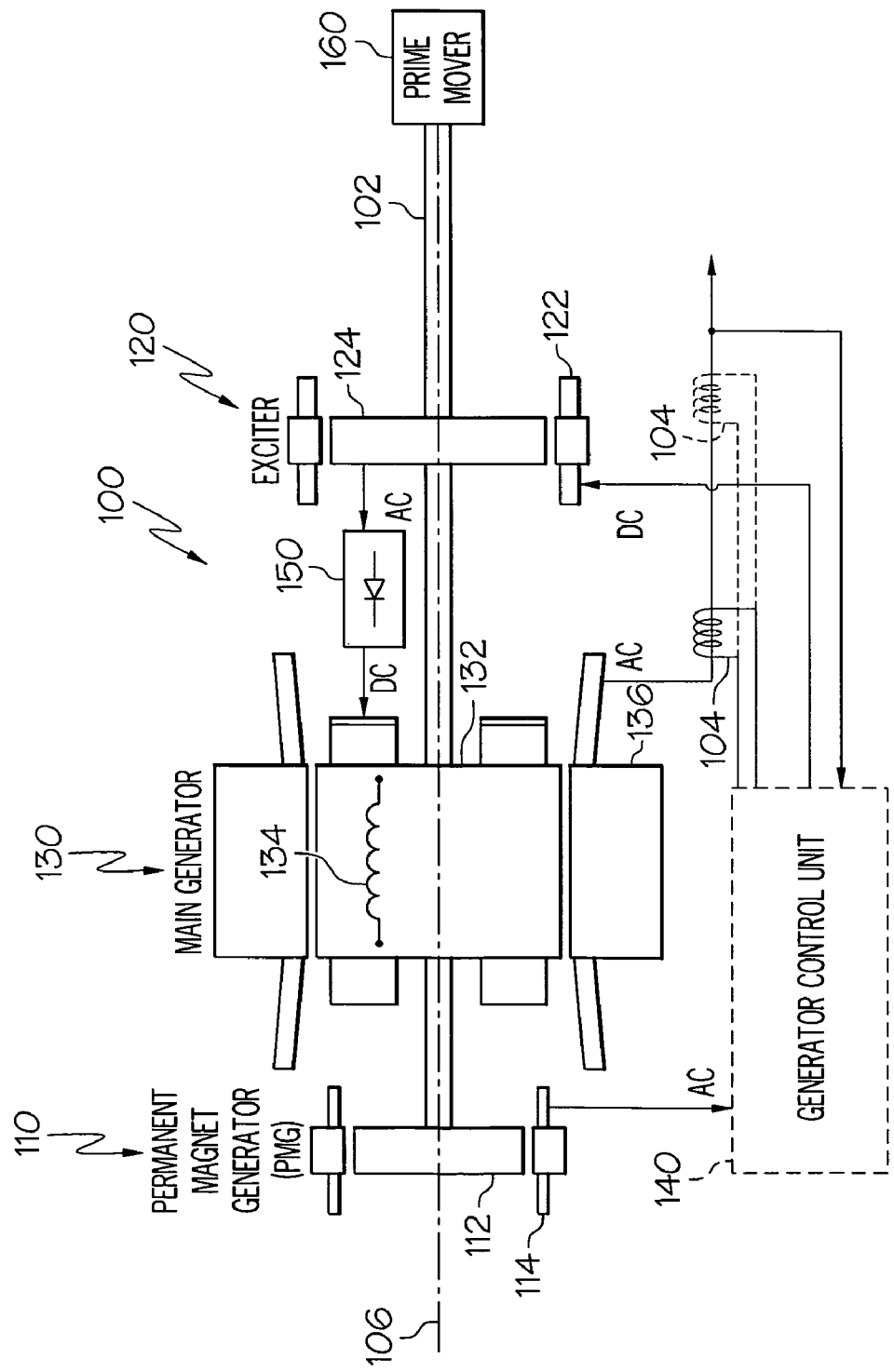
FIG. 1 is a functional schematic block diagram of an exemplary high speed generator system.

Turning now to FIG. 1, a functional schematic block diagram of an exemplary generator system 100 is depicted. This exemplary generator system 100, which is commonly known as a brushless AC generator system, includes a permanent magnet generator (PMG) 110, an exciter 120, a main generator 130, a generator control unit 140, and one or more rectifier assemblies 150.

In the depicted embodiment, a rotor 112 of the PMG 110, a rotor 124 of the exciter 120, and a rotor 132 of the main generator 130 are all mounted on a common shaft 102. The shaft 102 receives a rotational drive force from a prime mover 160, such as an aircraft gas turbine engine, which causes the PMG rotor 112, the exciter rotor 124, and the main generator rotor 132 to all rotate at the same rotational speed. The rotational speed of these components may vary. In one embodiment, the rotational speed may be, for example, in the range of about 12,000 to about 24,000 r.p.m., or greater.

No matter the specific rotational speed range, it will be appreciated that as the PMG rotor 112 rotates, the PMG 110 generates and supplies, via a PMG stator 114, AC power to the generator control unit 140. In response, the generator control unit 140 supplies DC power to a stator 122 of the exciter 120. In turn, this causes the exciter rotor 124 to supply AC power to the rectifier assemblies 150. The output from the rectifier assemblies 150 is DC power and is supplied to a rotor winding 134 on the main generator rotor 132. As the main generator rotor 132 rotates, it induces AC current in a main generator stator 136, which is in turn supplied to one or more loads. The generator control unit 140 can regulate the power output based upon monitoring signals provided to it from monitoring devices 104.

Figure 2:
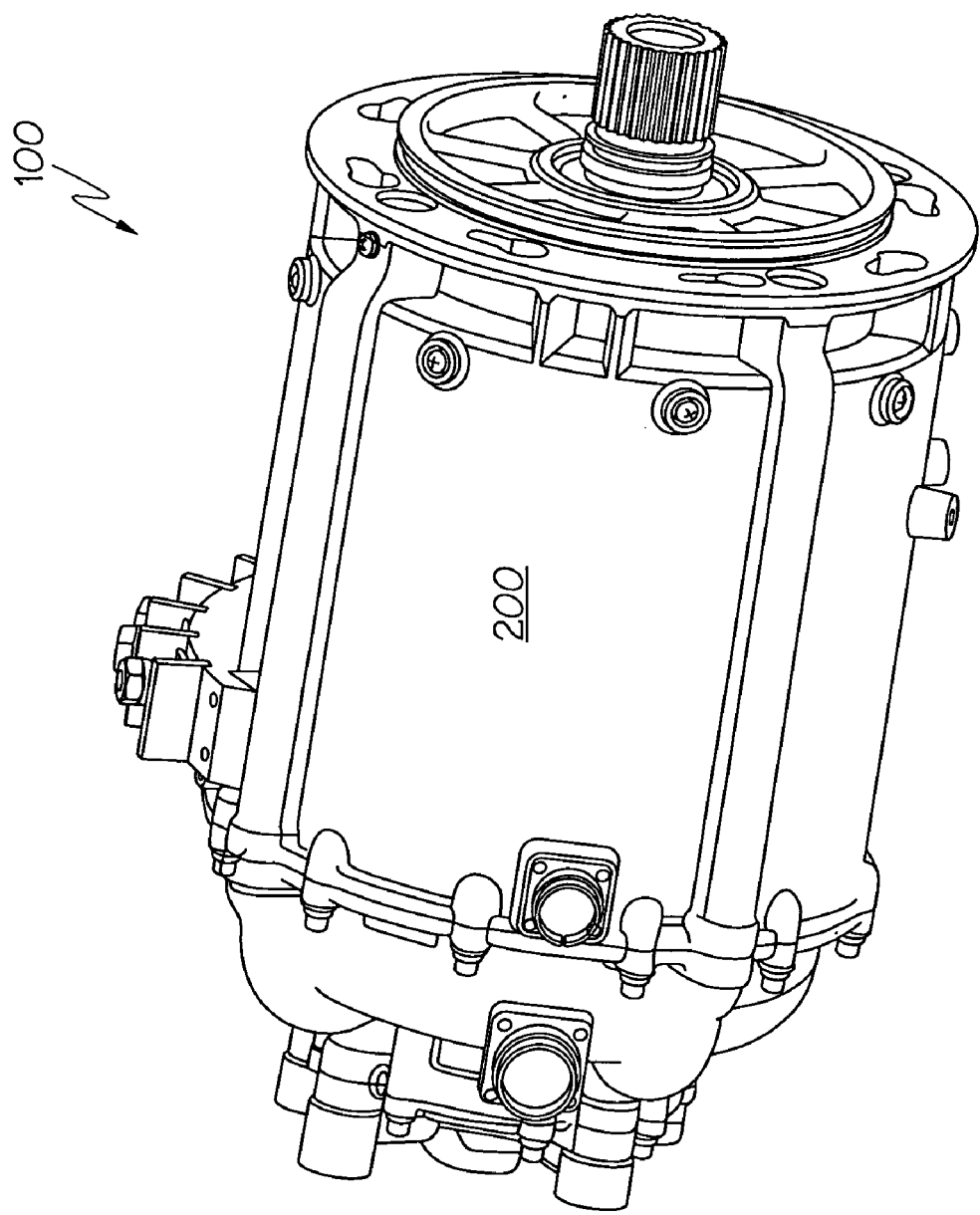
FIG. 2 is a perspective view of a physical embodiment of the generator system depicted in FIG. 1.

In the depicted embodiment, the PMG rotor 112, the exciter rotor 124, and the main generator rotor 132 are all mounted on the same shaft 102 and thus all rotate along a single axis 106 at the same rotational speed. It will be appreciated, however, that in other embodiments the PMG rotor 112 may rotate along a different axis. In such case, the rotors 112, 124, and 132 may be coupled to separate shafts. Moreover, the relative positioning of the PMG 110, the exciter 120, and the main generator 130 can be modified in different embodiments such that the exciter 120 is physically between the PMG 110 and the main generator 130. A perspective view of a physical embodiment of at least those portions of the generator system 100 that are mounted within a generator housing 200 is provided in FIG. 2.

Figure 3:
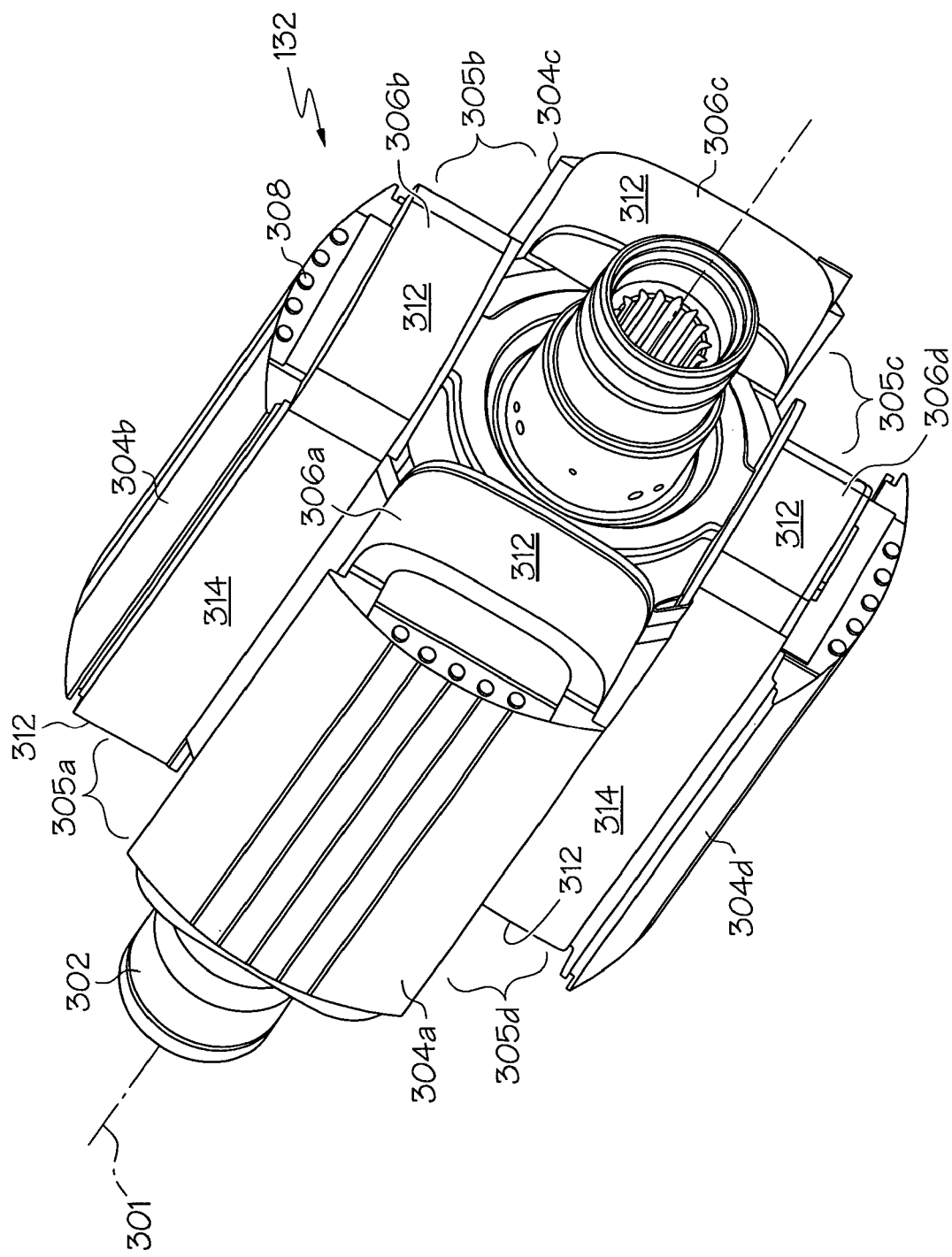
FIG. 3 is a perspective view of an exemplary embodiment of a partially assembled rotor that may be used in the generator depicted in FIG. 2.
Figure 4:
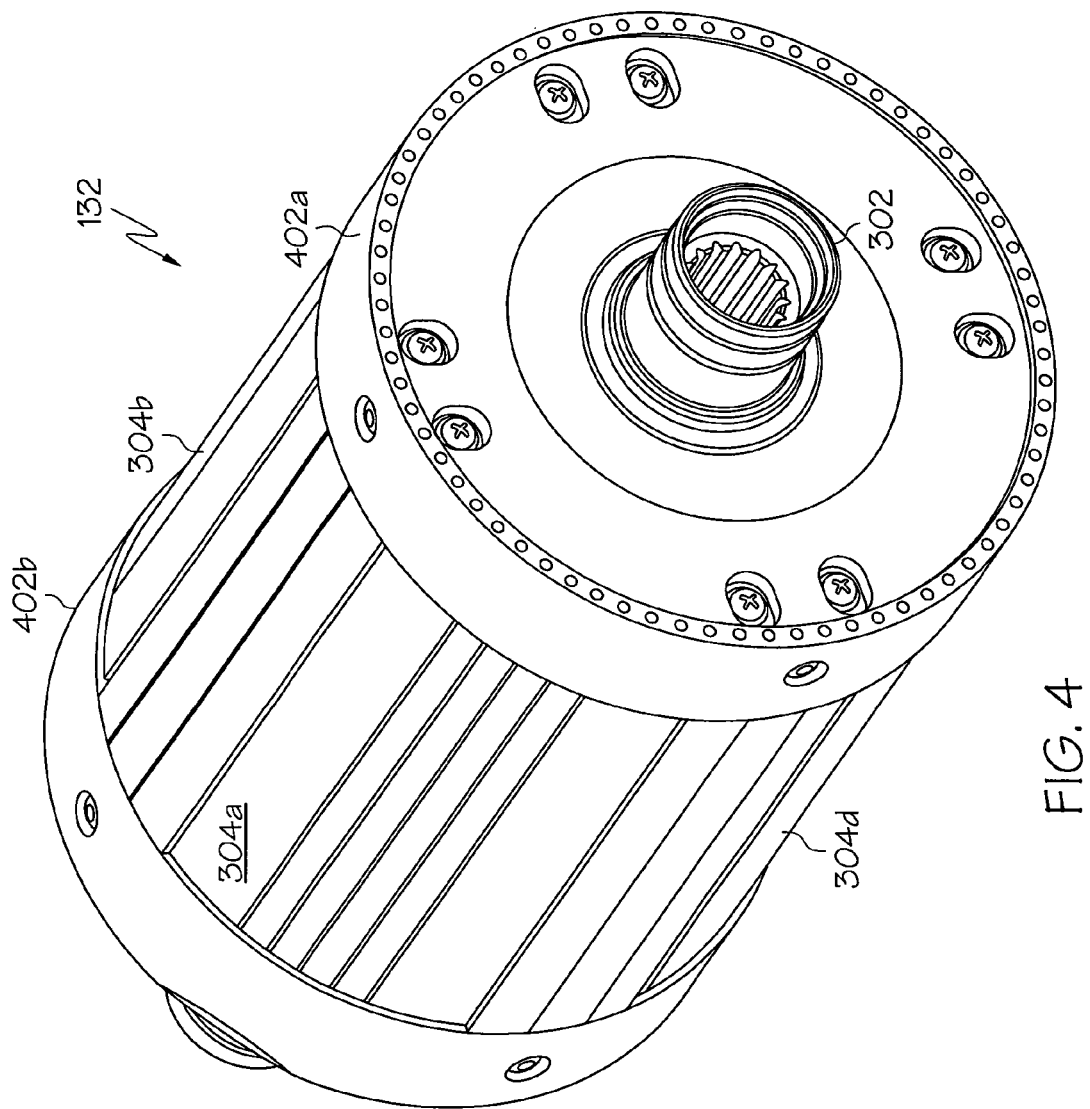
FIG. 4 is a perspective view of the rotor depicted in FIG. 3 in its fully assembled state.

Turning now to FIGS. 3 and 4, perspective views of an exemplary embodiment of the main generator rotor 132 in a partially assembled and a fully assembled condition, respectively, are depicted. As shown most clearly in FIG. 3, the rotor 132 includes a shaft 302, a plurality of poles 304a-d, and a plurality of coils 306a-d. The shaft 302 extends axially through the rotor 132 along an axis 301. Each of the poles 304a-d extends radially away from the shaft 302 and are generally spaced evenly apart from one another, forming an interpole region 305a-d between adjacent poles 304a-d. The coils 306a-d are wrapped, one each, around a respective pole 304a-d and include end turn sections 312 and side sections 314. The coils 306a-d are electrically coupled together to form the rotor winding 134. In addition, a plurality of weights 308 may be embedded within each of the poles 304a-d to provide proper balancing of the rotor 132.

The fully assembled rotor 132, which is shown in FIG. 4, includes two end turn retainers 402a and 402b, one on each end of the shaft assembly 302. The end turn retainers 402a, 402b assist in holding the end turn sections 312 of the coils 306a-d in place during rotor 132 rotation. The end turn retainers 402a, 402b additionally assist in holding rotor crossovers (not illustrated in FIG. 3), embodiments of which are described further below, in place. In the depicted embodiment the end turn retainers 402a, 402b are implemented as end caps. It will be appreciated, however, that this is merely exemplary, and that other devices such as, for example, retention bands or various types of fasteners, may instead be used.

As noted above, the depicted rotor 132 is designed for use in a generator, such as those commonly employed in aircraft. Thus, the components of the rotor 132 are typically manufactured from high-strength materials. For example, the poles 304a-d may be formed from steel, while the shaft 302 may be formed from steel, titanium, or high-strength aluminum. It will be appreciated, however, that these materials are only exemplary of a preferred embodiment and that other suitable materials can be employed. Moreover, although the rotor 132 depicted in FIGS. 3 and 4 is a 4-pole rotor, it will be appreciated that the present invention may be used with rotors having other numbers of poles. For example, in the remainder of the description the depicted rotor 132 is an 8-pole rotor, which includes eight rotor poles 304a-I, and eight rotor coils 306a-i.

Figure 5:
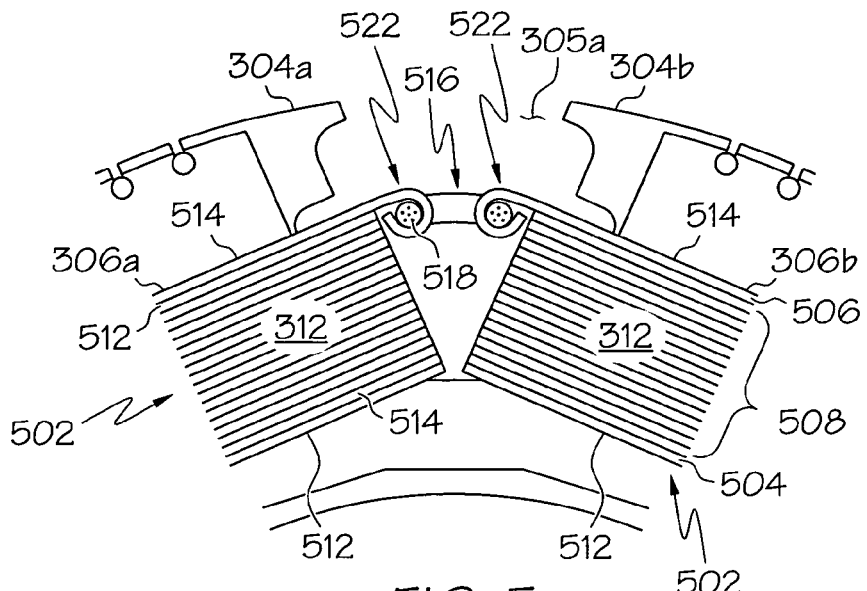
FIG. 5 is a partial cross section view of an 8-pole rotor, similar to the rotor shown in FIGS. 3 and 4, depicting an embodiment of a rotor crossover of the present invention.

With reference now to FIG. 5, it is seen that the coils 306a-i are preferably formed by wrapping a plurality of turns of wire 502 around the respective poles 304a-d. It is noted that, for clarity, only two of the coils 306a, 306b, which are representative of each of the coils 306a-d, are depicted in FIG. 5. The plurality of turns that comprise each coil 306a-i include an innermost turn 504, an outermost turn 506, and a plurality of intermediate turns 508. The innermost turn 504 is disposed radially inward of the outermost turn 506, and the plurality of intermediate turns are disposed between the innermost and outermost turns 504, 506. The wire 502 is preferably a substantially flat copper strip. As such, each of the plurality of turns 504, 506, 508 includes an inner surface 512 and an outer surface 514, with the inner surface 512 disposed radially inward of the outer surface 514. Moreover, and with quick reference once again to FIG. 3, each of the plurality of turns 504, 506, 508 includes the two end turn sections 312 and the two side sections 314. It will be appreciated that substantially flat copper strip is merely exemplary of a particular preferred wire 502, and that other suitable configurations and types of conductive wire 502 could be used.

As was previously noted, the coils 306a-i are electrically coupled in series to form the rotor winding 134. In the depicted embodiment, this is accomplished by electrically coupling the innermost turn 504 of every other adjacent coil 306a-i together, and electrically coupling the outermost turn 506 of the other adjacent coils 306a-i together. The innermost turn 504 are electrically coupled together via a lap braze technique that is generally well known, and is not further described. Conversely, the outermost turn 506 are electrically coupled together, as previously mentioned, via a rotor crossover 516. An exemplary embodiment of the rotor crossover 516 is depicted in both FIGS. 5 and 6, and with reference thereto will now be described.

The rotor crossover 516 includes a length of stranded wire conductor 518. The length, size, and rating of the stranded wire conductor 518 may vary depending, for example, on the size and rating of the windings 502. In a particular preferred embodiment, however, the stranded wire conductor 518 is about a 1.25-inch length of standard #12 AWG wire, having a first end section 602, a second end section 604, and an electrical insulation 606 surrounding a portion of the stranded wire conductor 518 between the first and second end sections 602, 604 (see FIG. 6). Moreover, the configuration of the stranded wire conductor 518 may vary but in a particular preferred embodiment, the stranded wire conductor 518 is configured to include a substantially U-shaped section 608 between the first and second end sections 602, 604.

Figure 6:
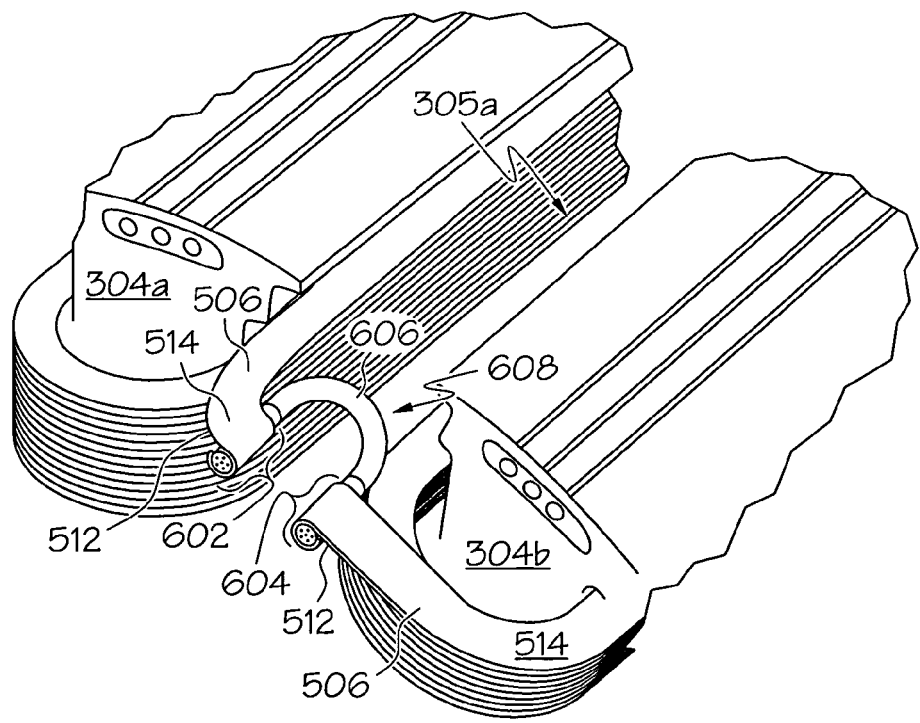
FIG. 6 is a perspective view of a partial section the rotor and exemplary rotor crossover shown in FIG. 5.

The first and second end sections 602, 604 are not surrounded by the insulation 606. Thus, the first and second end sections 602, 604 are coupled, one each, to adjacent coils (306a and 306b in FIGS. 5 and 6), to thereby electrically couple the adjacent coils 306a, 306b together. Preferably, as depicted in FIGS. 5 and 6, the first and second end sections 602, 604 are coupled to the outermost turn 506 of the adjacent coils 306a, 306b, and most preferably to the inner surface 512 of the outermost turn 506. It will be appreciated that this electrical coupling may be accomplished using any one of numerous techniques. However, in the depicted embodiment, the ends of the outermost turns 506 of the adjacent coils 306a-i are formed into a loop 522 having an inner diameter that is slightly larger than that of the first and second end sections 602, 604. Although the configuration of the loops 522 may vary, each is preferably formed such that the loop 522 is oriented radially inwardly so that the overall height of the coils 306a, 306b, when the rotor crossover 516 is coupled thereto, is not increased.

The first and second end sections 602, 604 are disposed within the loops 522 such that the U-shaped section 608 extends toward the interpole region 305a. The first and second ends 602, 604 are additionally coupled to the loops 522, thereby electrically coupling the adjacent coils 306a, 306b together. It will be appreciated that the first and second end sections 602, 604 may be coupled to the loops 522 using any one of numerous techniques including, for example, crimping, soldering, or welding. In a particular preferred embodiment, however, a resistance braze technique is used.

Figure 7:
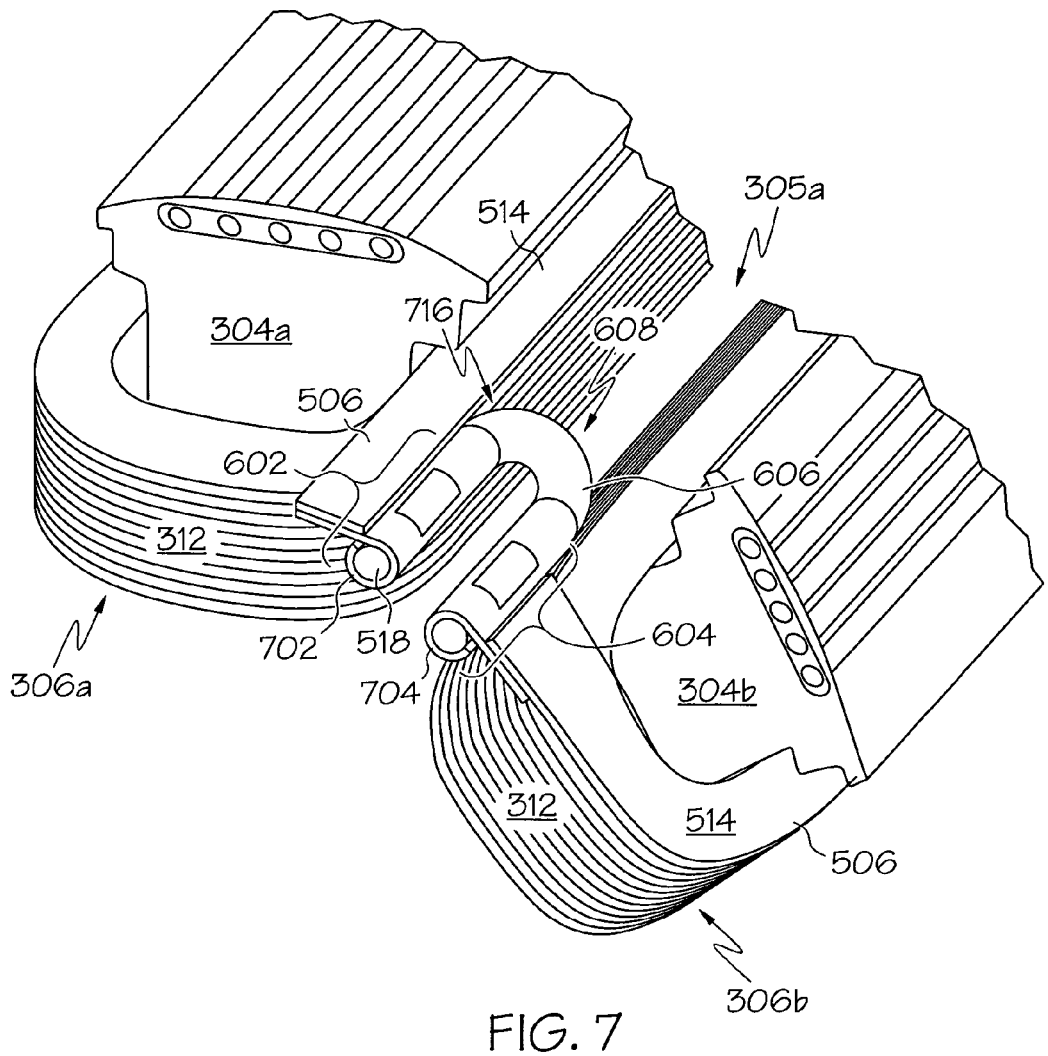
FIG. 7 is a perspective view of a partial section the rotor shown in FIG. 5 depicting an exemplary alternative embodiment of a rotor crossover of the present invention.
Figure 8:
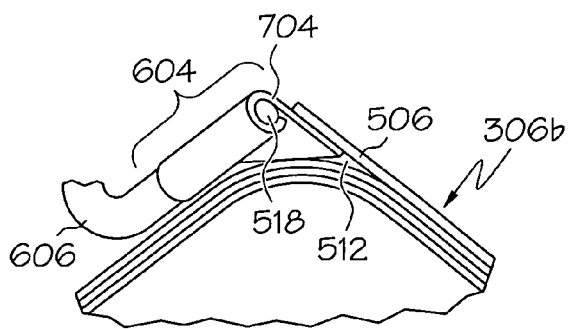
FIG. 8 is a perspective view of the a portion of the partial rotor shown in FIG. 7 depicting the connection of the rotor crossover to a rotor coil.
Figure 9:
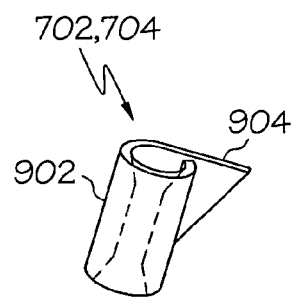
FIG. 9 is a perspective view of a crimp terminal that is used to implement the rotor crossover depicted in FIGS. 7 and 8.

The rotor crossover 516 described above and depicted in FIGS. 5 and 6 is merely exemplary of one particular exemplary embodiment. In another exemplary embodiment, which is depicted in FIGS. 7 and 8, the rotor crossover 716 includes, in addition to the stranded wire conductor 518, a first crimp terminal 702 and a second crimp terminal 704. The first and second crimp terminals 702, 704 are coupled to the first and second end sections 602, 604, respectively, and to the adjacent coils 306a, 306b, respectively. More specifically, and as shown more clearly in FIG. 9, the first and second crimp terminals 702, 704 each include a crimp barrel 902 and a terminal tab 904. The crimp barrel 902 may be variously configured, but in the depicted embodiment it is substantially cylindrical. The terminal tab 904 extends from the crimp barrel 902 and, in the depicted embodiment, has a triangular shape. It will be appreciated, however, that this shape is merely exemplary, and that the terminal tab 904 could be formed or made into any one of numerous other suitable shapes.

Returning now to FIGS. 7 and 8, it is seen that when the alternate rotor crossover 716 is used, the first and second end sections 602, 604 of the stranded wire conductor 518 are disposed within, and coupled to, the crimp barrels 902 of the first and second crimp terminals 702, 704, respectively, and the terminal tabs 904 of the first and second crimp terminals 702, 704 are coupled to the adjacent coils 306a, 306b, respectively. As before, the stranded wire conductor 518 is preferably disposed such that the U-shaped section 608 extends toward the interpole region 305a. Preferably, the crimp barrels 902 are each crimped onto the appropriate end section 602, 604 using a suitable crimp tool, and the terminal tabs 904 are each resistance brazed to the inner surface 512 of the outermost turn 506 of the appropriate coil 306a, 306b. It will be appreciated that crimping and resistance brazing are merely exemplary of particular preferred techniques, and that various other suitable techniques could also be used to couple the crimp barrels 902 to the first and second end sections 602, 604, and/or to couple the terminal tabs 904 to the coils 306a, 306b.

Figure 10:
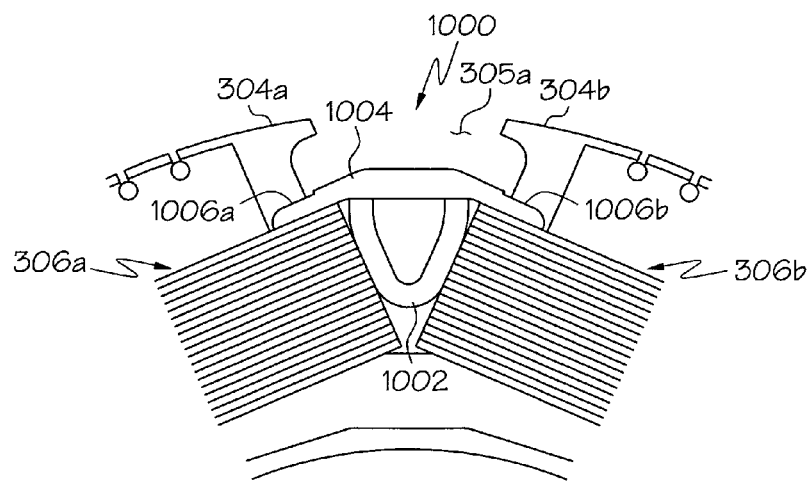
FIG. 10 is a partial cross section view of the rotor of FIG. 5 depicting a coil retention system.

In addition to the rotor crossovers 516, 716, the rotor 132 may also include a coil retention system to improve the strength and reliability of the coils 306a-d, to increase the life of the coil insulation system, and to minimize any rotor imbalance that may occur from movement of the coils 306a-i. Turning now to FIG. 10, an exemplary coil retention system 1000 is depicted and includes an interpole wedge 1002 and an interpole wedge retainer 1004. For clarity and ease of depiction, the rotor crossover 516, 716 is not depicted in FIG. 10. The interpole wedge 1002 fits into the interpole region 305a between the coils 306a, 306b of adjacent poles 304a, 304b, thereby providing lateral support for the coils 306a,b. The interpole wedge retainer 1004 is placed over, and in contact with, the interpole wedge 1002, and is disposed between the coils 306a, 306b and pole tips 1006a, 1006b of the respective poles 304a, 304b. Although not depicted, it is noted that a layer of an electrical insulation material such as, for example, dielectric paper, is preferably positioned between the coils 306a, 306b and the interpole wedge 1002 and the interpole wedge retainer 1004.

Figure 11:
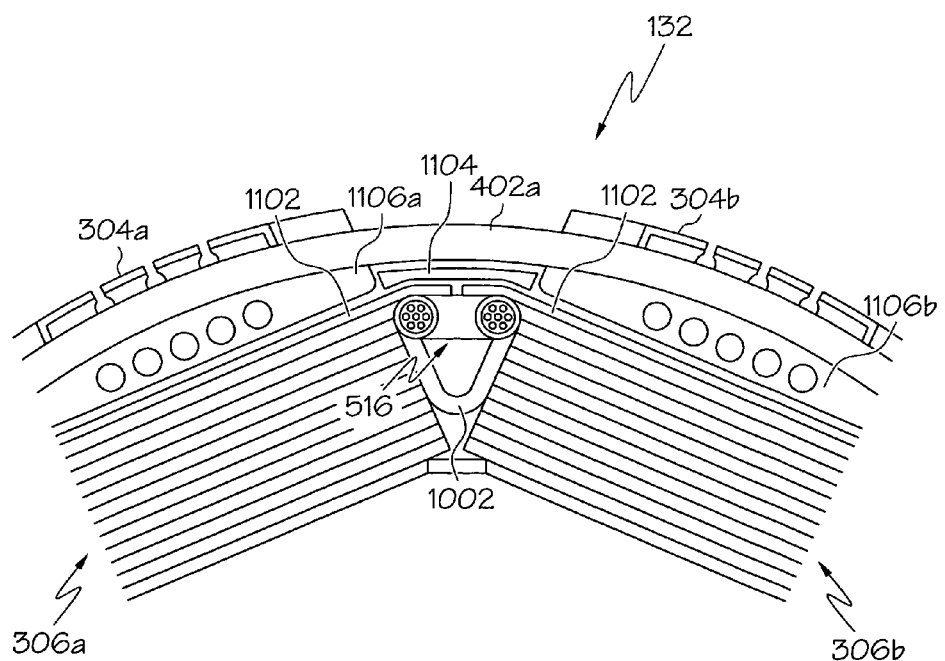
FIG. 11 is a partial cross section view of the fully assembled rotor shown in FIG. 5.

Turning now to FIG. 11, a partial end cross section view of a fully assembled rotor 132, that uses the rotor crossover 516 shown in FIGS. 5 and 6, is depicted. The end turn retainer 402a surrounds the rotor crossover 516 and the ends of the coils 306a-i and, together with a plurality of insulator shims 1102, 1104 and band supports 1106a-i (one per coil 306a-i), prevent the rotor crossover 516 and coil end turn sections 312 from moving radially outward under the centrifugal load these components experience during rotor 132 rotation. However, the insulator shims 1102, 1104, being relatively impervious the epoxy vacuum pressure impregnation process that occurs during rotor assembly, will ensure the relatively flexible U-shaped section 608 (not shown in FIG. 11) will open circumferentially a sufficient amount to relieve induced cyclic stresses that may result from mechanical and thermal cycles encountered during machine operation, startup, and shutdown. It will be appreciated that the stresses in the individual wire strands of the rotor crossover 516, 716 are preferably engineered to be below the material fatigue stress for the operational life of the machine 100.

The coils 306a-i and rotor crossover 516 may be installed and coupled according to any one of numerous methodologies. In a particular preferred method, the wires 502 that will be wound on the particular adjacent poles 304a-i to form the associated adjacent coils 306a-i are first prepared. This preparation may vary, depending on the particular wire 502 that is being used, but in the preferred embodiment, in which the wire 502 is the substantially flat copper wire, the wires 502 are prepared by removing the insulation coating a predetermined distance from the end of the wires 502 that will correspond to the outermost turns 506.

The loop 522 is then formed into the non-insulated end of the wire 502. As noted above, the loop 522 is preferably formed with an inner diameter that is slight greater than that of the stranded wire conductor 518. Thus, in the above described embodiment, in which the stranded wire conductor 518 is #12 AWG, which has an outer diameter of about 0.088 inches, the inner diameter of the loop 522 should be about 0.090 inches. Moreover, the loop 522 is preferably formed so that it is substantially cylindrical and fully closed, and oriented so that when the wire 502 is wound on the pole 304 the loop 522 is oriented radially inwardly.

Thereafter, or substantially simultaneously with the above, the rotor crossover 516 is prepared. This is preferably accomplished by obtaining a predetermined length of an appropriately sized and rated stranded conductor 518 having the electrical insulation 606 disposed thereon. A portion of the electrical insulation 606 is stripped away from the around the ends of the stranded conductor 518 to thereby form the first and second end sections 602, 604. The length of the stranded conductor 518 and the length of electrical insulation 606 that is removed therefrom may vary, but in a particular embodiment, such as the one described above, the length of the conductor 518 is preferably about 1.25 inches and the electrical insulation 606 is stripped back about 0.275 inches from each end thereof.

The U-shaped section 608 is also formed in the stranded wire conductor 518, either after the above steps or simultaneously therewith. In either case, the U-shaped section 608 may be formed using any one of numerous means and may, when formed, have any one of numerous desired bend radii. In a particular preferred embodiment, the bend radius is about 0.094 inches and is formed at the midpoint of the stranded wire conductor 518.

When the wire 502 and rotor crossover 516 are properly prepared, one of the end sections 602 or 604 is inserted into the loop 522. The rotor crossover 516 is preferably oriented, upon its insertion, such that when the wire 502 is wound on the pole 304 the U-shaped section 608 will extend toward the interpole region 305. The inserted end section 602 or 604 is then coupled to the wire 502 within the loop 522 by, for example, resistance brazing the end section 602 or 604 therein. While conducting the resistance brazing operation, preferably care is taken to ensure the stranded wire conductor 518 remains free fo braze material underneath the electrical insulator 606. Thereafter, if not already done so, the wire 502 is wound onto the appropriate rotor pole 304 to form the coil 306.

Once the adjacent wire 502 has been prepared and wound onto the adjacent pole 304 to form the adjacent coil 306, the other end section 604 or 602 is inserted into the loop 522 that is formed in the adjacent coil 306. The end section 604 or 602 is then coupled to the wire 502 within the loop 522 by, for example, resistance brazing the end section 604 or 602 therein.

When the alternative rotor crossover 716 is used, the wires 502 that will be wound on the particular poles 304 to form the associated adjacent coils 306 are prepared somewhat similar to the other embodiment. This preparation may vary, depending on the particular wire 502 that is being used, but in the preferred embodiment, in which the wire 502 is substantially flat copper wire, the wires 502 are prepared by removing the insulation coating a predetermined distance from the end of the wires 502 that will correspond to the outermost turns 506. In this instance, however, the loop 522 is not formed in the wire 502 end.

Thereafter, or substantially simultaneously with the above, the rotor crossover 716 is prepared. This is accomplished similar to the previous embodiment, with a few minor exceptions. As before, a predetermined length of an appropriately sized and rated stranded conductor 518 having the electrical insulation 606 disposed thereon is obtained. A portion of the electrical insulation 606 is stripped away from the around the ends of the stranded conductor 518 to thereby form the first and second end sections 602, 604. The length of the stranded conductor 518 and the length of electrical insulation 606 that is removed therefrom may vary, but in a particular embodiment, such as the one described above, the length of the conductor 518 is preferably about 1.375 inches and the electrical insulation 606 is stripped back about 0.375 inches from each end thereof.

The U-shaped section 608 is also formed in the stranded wire conductor 518, either after the above steps or simultaneously therewith. In either case, the U-shaped section 608 may be formed using any one of numerous means and may, when formed, have any one of numerous desired bend radii. In a particular preferred embodiment, the bend radius is about 0.094 inches and is formed at the midpoint of the stranded wire conductor 518.

The crimp terminals 702, 704 are either obtained or prepared, and are then coupled to the inner surface 512 of the prepared ends of the wires 502. This may be done using any one of numerous suitable techniques, but it is preferably accomplished via resistance brazing. Thereafter, one of the end sections 602 or 604 is inserted into one of the crimp terminals 702 or 704, and the rotor crossover 716 is preferably oriented, upon its insertion, such that when the wire 502 is wound on the pole 304 the U-shaped section 608 will extend toward the interpole region 305. The inserted end section 602 or 604 is then coupled to the crimp terminal 702 or 704 by, for example, crimping the crimp terminal 702 or 704 using a suitable crimp tool.

Thereafter, if not already done so, the wires 502 are wound onto the appropriate adjacent rotor poles 304 to form the adjacent coils 306. The other end section 604 or 602 is then inserted into the crimp terminal 704 or 702 on the adjacent coil 306. The end section 604 or 602 is then coupled to the crimp terminal 704 or 702 within the loop 522 by, for example, crimping the crimp terminal 704 or 702 using a suitable crimp tool.

The rotor crossovers 516, 716 described herein are relatively flexible are thus less susceptible to cracking under the centrifugal forces that may be exerted during machine 100 operation. The rotor crossovers 516, 716 are also less susceptible to cracking under the mechanical and thermal cycles encountered during machine 100 startup and shutdown operations.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A rotor for use in a high speed electrical machine, comprising:
    a shaft;
    first and second rotor poles, each rotor pole extending radially outwardly from the shaft and spaced apart from each other to form an interpole region therebetween;
    first and second coils wrapped around the first and second rotor poles, respectively; and
    a rotor crossover coupled to the first and second coils, the rotor crossover including:
        a stranded wire conductor having a first end section and a second end section, the first end section coupled to the first coil, the second end section coupled to the second coil, and
        an insulator continuously surrounding the stranded wire conductor between the first end and the second end sections,
        wherein the first end section and the second end section are disposed parallel to an axis of the shaft to enable the rotor crossover to accommodate centrifugal force exerted upon the rotor crossover by the rotation of the rotor, and the stranded wire conductor is removeably coupled to the coils to allow removal and replacement of a defective coil without further disassembly of the rotor.

2. The rotor of claim 1, wherein the rotor crossover is brazed to the first and second coils.

3. The rotor of claim 1, wherein:
    the rotor crossover is substantially U-shaped between the first and second end sections; and
    at least a portion of the rotor crossover between the first and second end sections is disposed within the interpole region.

4. The rotor of claim 1, wherein the rotor crossover further includes
    a first crimp terminal coupled to the first end and to the first coil; and
    a second crimp terminal coupled to the second end and the second coil.

5. The rotor of claim 4, wherein the first and second crimp terminals each include:
    a substantially tubular crimp barrel surrounding the stranded wire conductor and crimped thereto; and
    a terminal tab extending from the tubular section and coupled to one of the coils.

6. The rotor of claim 5, wherein each of the terminal tabs is brazed to one of the coils.

7. The rotor of claim 1, wherein at least a portion of the rotor crossover is disposed within the interpole region.

8. The rotor of claim 1, wherein:
    the first and second coils each comprise a plurality of turns of wire, the plurality of turns of wire including an innermost turn, an outermost turn, and a plurality of intermediate turns disposed between the innermost and outermost turns, the innermost turn disposed radially inward of the outermost turn; and
    the rotor crossover is coupled to the outermost turn of the first and second coils.

9. The rotor of claim 8, wherein:
    each turn of wire includes an inner surface and an outer surface, the inner surface disposed radially inward of the outer surface; and
    the rotor crossover is coupled to the inner surface of the outermost turn.

10. The rotor of claim 9, wherein the plurality of turns each include two end turn sections and two side sections, and wherein the rotor further comprises:
    a pair of end turn retainers, each end turn retainer surrounding at least a portion of each of the end turns and at least a portion of the rotor crossover.

11. The rotor of claim 1, further comprising:
    a coil interpole wedge positioned in the interpole region between the first and second coils; and
    a coil interpole wedge retainer positioned over the coil interpole wedge, and interference fit between the first coil and a surface of the first pole and the second coil and a surface of the second pole.

12. A rotor for use in a high speed electrical machine, comprising:
    a shaft;
    first and second rotor poles, each rotor pole extending radially outwardly from the shaft and spaced apart from each other to form an interpole region therebetween;
    first and second coils wrapped around the first and second rotor poles, respectively, the first and second coils each including a plurality of turns of wire, the plurality of turns of wire including an innermost turn, an outermost turn disposed radially outward of the innermost turn, and a plurality of intermediate turns disposed between the innermost and outermost turns, each turn of wire including an inner surface and an outer surface that is disposed radially outward of the inner surface;
    first and second crimp terminals coupled to the outermost turn of the first and second coils, respectively;
    a coil interpole wedge positioned in the interpole region between the first and second coils;
    a coil interpole wedge retainer positioned over the coil interpole wedge, and interference fit between the first coil and a surface of the first rotor pole and the second coil and a surface of the second rotor pole; and
    a rotor crossover coupled to the inner surfaces of the first and second coil outermost turns, the rotor crossover including:
        a stranded wire conductor having a first end section and a second end section, the first end section coupled to the first crimp terminal, the second end section coupled to the second crimp terminal, and
        an insulator continuously surrounding the stranded wire conductor between the first end and the second end sections;

wherein the stranded wire conductor enables the rotor crossover to accommodate centrifugal force exerted upon the rotor crossover by the rotation of the rotor and the crimp terminals are disposed to allow removal and replacement of a defective coil without further disassembly of the rotor.

13. The rotor of claim 12, wherein the rotor crossover is brazed to the first and second coil outermost turns.

14. The rotor of claim 1, wherein the first and second crimp terminals each include:
  a substantially tubular crimp barrel surrounding the stranded wire conductor and crimped thereto; and
  a terminal tab extending from the tubular section and coupled to one of the coils.

15. The rotor of claim 14, wherein each of the terminal tabs is brazed to one of the coil outermost turns.

16. The rotor of claim 12, wherein the first end section and the second end section are disposed parallel to an axis of the shaft.

17. A rotor for use in a high speed electrical machine, comprising:
  a shaft;
  first and second rotor poles, each rotor pole extending radially outwardly from the shaft and spaced apart from each other to form an interpole region therebetween;
  first and second coils wrapped around the first and second rotor poles, respectively;
  first and second crimp terminals coupled to the first and second coils, respectively;
  a coil interpole wedge positioned in the interpole region between the first and second coils;
  a coil interpole wedge retainer positioned over the coil interpole wedge, and interference fit between the first coil and a surface of the first rotor pole and the second coil and a surface of the second rotor pole; and
  a rotor crossover coupled to the first and second coils, the rotor crossover including:
    a stranded wire conductor having a first end section and a second end section the first end section coupled to the first crimp terminal, the second end section coupled to the second crimp terminal, and
    an insulator surrounding the stranded wire conductor between the first end and the second end sections;
  wherein the rotor crossover is substantially U-shaped between the first and second end sections; the first end section and the second end section are disposed parallel to an axis of the shaft to enable the rotor crossover to accommodate centrifugal force exerted upon the rotor crossover by the rotation of the rotor; and the crimp terminals are disposed to allow removal and replacement of a defective coil without further disassembly of the rotor.

18. The rotor of claim 17, wherein:
  at least a portion of the rotor crossover between the first and second end sections is disposed within the interpole region.

19. The rotor of claim 17, wherein the insulator surrounding the stranded wire conductor is continuous between the first end and the second end sections.

* * * * *

UNITED STATES PATENT AND TRADEMARK OFFICE
CERTIFICATE OF CORRECTION

PATENT NO. : 7,605,505 B2  Page 1 of 1
APPLICATION NO. : 11/213172
DATED : October 20, 2009
INVENTOR(S) : Minke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Fifth Day of October, 2010

David J. Kappos
*Director of the United States Patent and Trademark Office*